3,022,227
PROCESS FOR THE PREPARATION OF HIGHLY CONCENTRATED COMPOSITIONS OF THE RECEPTOR DESTROYING ENZYME NEURAMINIDASE
Gerhard Schramm and Elisabeth Mohr, Tubingen, Germany, assignors to Behringwerke Aktiengesellschaft, Marburg (Lahn), Germany, a corporation of Germany
No Drawing. Filed Dec. 16, 1958, Ser. No. 780,678
Claims priority, application Germany Dec. 20, 1957
10 Claims. (Cl. 195—62)

A number of important viruses of the myxo group such as the influenza and mumps viruses and the viruses of the fowl plague and Newcastle disease contain an enzyme neuraminidase that has a splitting effect on certain receptors of the cell wall. In the English literature it is also designated as RDE (receptor destroying enzyme). The receptors belong to the group of the mucoproteids. Blix, Kuhn, Klenk and especially Gottschalk proved that the action of RDE or the neuraminidase consists in the elimination of neuraminic acid being present in glycosidal linkage. Neuraminidase is also produced by various microorganisms and is for example contained in a high quantity in culture liquids of cholera vibrios. These culture liquids serve thus as starting material for the preparation of neuraminidase. The enzyme has acquired medicinal and diagnostic importance since it was found that by the preliminary treatment of sensitive tissues the strength of the subsequent infection with the above described myxo viruses is diminished.

Various processes are known for the purification of neuraminidase (RDE) and for elimination of ineffective ballast substances. However, these processes show marked disadvantages. They yield, for example impure compositions with partially great losses of active substance.

As starting material for the concentration of neuraminidase there served cholera filtrates whose specific activity amounts generally to 0.02 unit/microgram N, that is to say that 50 micrograms of protein-N are necessary for splitting off 1 microgram of neuraminic acid from a suitable substrate under standard conditions within 15 minutes at 37° C.

Neuraminidase is precipitated according to known processes with an ammonium sulfate solution of 50% strength. In this case a specific activity of 0.1–0.3 unit/microgram N, that is to say about a tenfold concentration, is obtained. The yields amount only to about 60%.

Simple precipitations with methanol or similar solvents miscible with water show about the same results. By repeated fractional precipitation there is obtained at best a specific activity of 1–1.5 units/microgram N with a high loss of enzyme.

It is further known that neuraminidase can be markedly concentrated by adsorption on human erythrocytes in the cold and subsequent elution in the warmth. There are obtained enzyme activities of about 4 corresponding to about a 200-fold concentration. The yields amount to 70–80% of the total activity. However, the compositions thus obtained still contain impurities such as hemoglobin and other constituents of the erythrocytes. By the subsequent precipitation of these eluates with ethanol of 30% strength it is possible to increase the activity once more by 3 times its amount so that the specific activity of 12 units/microgram N can be obtained although with considerable losses of the yield.

Now it has been found that much more effective compositions can be obtained in simple manner by chromatographing a neuraminidase solution, if desired previously purified according to known processes, at a column of hemolized erythrocytes (*Stromata achromatocytes*) admixed with a carrier material, the adsorption being effected at a weakly alkaline reaction and at temperatures below about 10° C. and the elution at a weakly acid reaction and a temperature above about 0° C. The adsorption is suitably carried out at a pH of 7.0–9.5, advantageously at a pH of 8.5–9. The temperature of the adsorption is advantageously maintained at about 0° C. The pH value during the elution should amount to about 4.0–7.0, advantageous to 5.3–5.8. The temperature may be maintained between about 0° C. and about 40° C. The operation is preferably carried out at room temperature or below.

It was found that instead of human erythrocytes being procured only with difficulty there may also be used erythrocytes of sheep, cattle and pigs. As carrier substance may be used, for example, aluminum oxide, glass powder, synthetic resins and preferably kieselgur.

For elimination of adhering hemoglobin and other accompanying proteins the chromatographic columns are advantageously washed with weakly alkaline, then with weakly acid and finally again with weakly alkaline buffer solutions until there are no more impurities in the eluate which can be found out in the simplest manner by measuring the extinction at 280 m$\mu$. In the case of columns prepared with the use of kieselgur the rest of the hemoglobin of the stromata can easily and rapidly be eliminated in this manner.

After washing, the column is cooled below about 10° C. and the likewise cooled enzyme solution which is adjusted to show a weakly alkaline reaction is chromatographed. When the proportions of enzyme, stromata and, for example, kieselgur are chosen in the appropriate manner, neuraminidase is completely adsorbed also in the case of comparatively short columns, whereas the accompanying proteins smoothly pass through. The column is then washed with a cooled, weakly alkaline buffer solution until all accompanying substances are removed.

For the elution the column is warmed to a temperature above about 0° C. and neuraminidase is washed out with a weakly acid buffer solution. The fractions containing the enzyme are collected and the single fractions are tested for their absorption at 280 m$\mu$ and for their enzyme activity.

The fractions containing the enzyme are collected and can further be concentrated by careful evaporation.

The chromatographic process works practically without losses and leads to a surprisingly high specific activity of at least 80 units/microgram N. As compared with the initial activity of 0.02 unit/microgram N in the cholera filtrate this corresponds to at least a 4000-fold concentration. When working carefully it is easily possible to increase the activity to about 120 units/microgram N.

Instead of working with chromatographic columns it is also possible to carry out the adsorption and the elution according to the batch process. In this case the same conditions as regards pH-value and temperature have to be observed as when working with chromatographic columns.

The special advantage of the process of the present invention resides in the fact that it is simple and cheap since the auxiliaries required, especially animal erythrocytes and kieselgur, can easily be obtained. Difficult filtration and concentration measures are avoided. The process provides very good yields and, after a simple preliminary purification, it can also be applied to solutions having a low content of neuraminidase.

The following example serves to illustrate the invention but it is not intended to limit it thereto.

EXAMPLE

*(a) Preliminary concentration*

For preliminary purification and concentration there are dialized 500 cc. of cholera filtrate against a sodium borate buffer having a pH of 9 (0.01 molar sodium borate, 0.9% of NaCl and 0.1% of $CaCl_2$) which are then mixed for 10 minutes at 0° C. by stirring with 20 cc. of a washed sediment of erythrocytes. The whole is then centrifuged in the cold at 3500 revolutions per minute and eluated at 37° C. with 25 cc. of an acetate buffer having a pH of 5.5 There is thus already obtained an about 200-fold concentration (specific activity 4 units/microgram N and, at a yield of about 80%, a 20-fold concentration.

The enzyme activity is determined as follows:

(b) Determination of enzyme activity

As standard substrate for the test there was prepared a stable urine mucin. 12 hours before the commencement of the test this mucin was dissolved in distilled water (4 mg. per cc.). To 1 cc. each of this mucin solution contained in thin-walled small centrifuge glass vessels there is added an enzyme solution to be tested in a 0.1 molar sodium acetate buffer solution (pH 5.5) containing 0.9% of NaCl and 0.1% of $CaCl_2$ and made up to 2 cc. with a 0.1 molar acetate buffer solution (pH 5.5). The enzyme solution should not exceed 0.5 cc. since otherwise the content of NaCl would reduce the solubility of mucin. The samples are kept for 15 minutes at 37° C. in the water bath. Thereupon 2 cc. each of a 50% solution of benzoic acid in chloroform are added, the solution is shaken well and centrifuged for 5 minutes at 3500 revolutions per minute. The mucin is then precipitated in a quantity of 97–98% and is to be found between the chloroform layer and supernatant aqueous layer containing the split off neuraminic acid of which at most 5% are carried down in precipitation. 1 cc. of this solution is pipetted off and tested for the content of neuraminic acid by means of Bial's orcin test according to Böhm and Baumeister. The separation is expressed in microgram of split off neuraminic acid.

It is of advantage to keep the split off substance between 10 and 20% since the error occurring during the determination would otherwise have to be taken into consideration. Above 20% the ratio of splitting of the enzyme quantity is no longer proportional.

(c) Chromatographic adsorption

The blood of sheep is defibrinated, the erythrocytes are separated by centrifuging and washed 3 times with a physiological NaCl solution. 25 cc. of the sediment of erythrocytes are hemolized in the usual manner by addition of distilled water and the achromatocytes obtained therefrom are suspended in 10 cc. of buffer solution having a pH of about 9 (see above), mixed with 3 grams of kieselgur and, if desired, washed in the centrifuge flask with the same buffer solution. This mixture is filled into a chromatographic tube having a diameter of about 20 mm. thus forming a column of about 4 cm. length. The end of the chromatographic tube is closed by means of glass wool and a filter of glass fiber paper. The column material is likewise covered with a filter of glass fiber paper.

In order to remove the hemoglobin adhering to the achromatocytes the column is at first washed with a borate buffer having a pH of about 9 (see above under a), then with an acetate buffer (0.05 mol) having a pH of about 5.5 (see above under b) and finally with a borate buffer until the solution passing through does no longer show an extinction at 280 mμ. A cooling jacket of about 0° C. is then placed around the column.

After equalization of temperature has taken place, the cooled enzyme solution (10 cc.) preliminarily concentrated according to (a) is poured on the column. This enzyme solution contains altogether about 6000 enzyme units (specific activity about 4 units/microgram N). By means of an automatic fraction collector the solution is divided into fractions of 2 cc. each. The ratio of flow amounts to about 15 drops per minute. By a slight outer pressure from a nitrogen bomb the ratio of flow can be regulated. Due to the non adsorbed accompanying substances the extinction in the fractions rises at first, but after washing with a cold borate buffer it falls rapidly to zero. The temperature in the outer jacket of the chromatographic tube is then raised to about 15° C. and the enzyme is eluated by addition of an acetate buffer.

The fractions were tested for extinction at 280 mμ and for enzyme activity. The first 7 small tubes (14 cc.) do not show any enzyme activity. The tubes 8–10 (altogether 6 cc.) contain practically the total activity used of 6000 units. The following tubes partly contain adsorbing material but no longer any enzyme quantities worth mentioning. The following data show the concentration factor achieved.

The specific activity, that is to say the enzyme activity per microgram of protein-N, is to be determined. An enzyme unit is the quantity of enzyme being capable of splitting off within 15 minutes at 37° C. 1 microgram of neuraminic acid from the mucin used. The specific activity of the starting solution amounted to 0.02 unit/microgram N. The specific activity of the preconcentrated solution amounted to 4 units/microgram N and the specific activity after chromatographic adsorption to 80 units/microgram N.

Thus, there is altogether obtained an approximately 4000-fold concentration effect. A further advantage of the process of the present invention resides in the fact that the volume is markedly reduced. The volume of the starting solution amounts to about 200 cc., that of the final solution only to 6 cc. The enzyme solution can further be concentrated.

Since highly purified neuraminidase compositions become easily inactive on standing, it is of advantage to add stabilizers to the compositions. As stabilizers there are advantageously used complex-forming compounds, for example alkali metal cyanides such as sodium cyanide, sodium ethylene-bis-amino-diacetate or sodium nitrilotriacetate or serum albumins. The addition of stabilizers is particularly appropriate when concentrating the enzyme solution.

By addition of neutral salts such as ammonium sulfate or organic solvents miscible with water, such as alcohol, or methanol, in the cold there is obtained a crystalline, needle-shaped precipitate.

When observing the same conditions as regards the pH-values and the temperature, the highly purified compositions can also be obtained in the batch process. Instead of a cholera filtrate preliminarily purified it is also possible to chromatograph a cholera filtrate directly according to the invention.

We claim:

1. A process of preparing crystalline neuraminidase which comprises chromatographing a solution containing neuraminidase on hemolyzed erythrocytes (stomata, achromatocytes) admixed with a carrier material, the adsorption being effected at a weakly alkaline reaction and at temperatures below about 10° C. and the elution at a weakly acid reaction and a temperature above about 0° C., adding a stabilizer to the solution thus obtained and separating crystalline needle-shaped neuraminidase from the liquid by addition of a precipitant.

2. A process as claimed in claim 1 wherein the adsorption and elution are carried out by chromatographing at a column.

3. A process as claimed in claim 1, wherein the adsorption is carried out at a pH-value of 7.0–9.5.

4. A process as claimed in claim 1, wherein the adsorption is carried out at a pH-value of 8.5–9.

5. A process as claimed in claim 1, wherein the elution is carried out at a pH-value of 4.0–7.0 and at a temperature of about 0° C.–40° C.

6. A process as claimed in claim 1, wherein the elution is carried out at a pH-value of 5.3–5.8 and at a temperature of about 15° C.

7. A process as claimed in claim 1, wherein kieselgur is used as carrier material for the hemolized erythrocytes.

8. A process as claimed in claim 1, wherein adsorption and elution are carried out in the batch process.

9. A process as claimed in claim 1, wherein hemolized erythrocytes of sheep with kieselgur as carrier material are used for the chromatographic adsorption, the adsorption being carried out at a pH-value of about 9 and at a temperature of 0° C. and the elution at a pH-value of about 5.5 and at a temperature of about 15° C.

10. Crystalline neuraminidase.

References Cited in the file of this patent

UNITED STATES PATENTS 2,717,852    Stone _____ Sept. 13, 1955

OTHER REFERENCES

Bender et al.: Biochemical Journal, 46, p. 210 (1950).

Boyden: The Adsorption of Proteins on Erthrocytes Treated with Tannic Acid and Subsequent Hemagglutination by Anti-protein Sera; Journal of Experimental Medicine, vol. 93, 1951, pp. 107–20.

The Enzymes, edited by James B. Summer, vol. II, part I, pages 511–518 and 523–524; Academic Press Inc. Publishers, 1951.